A. J. HAUG.
PULP SCREENING.
APPLICATION FILED JAN. 28, 1918.
1,319,705. Patented Oct. 28, 1919.
2 SHEETS—SHEET 1.
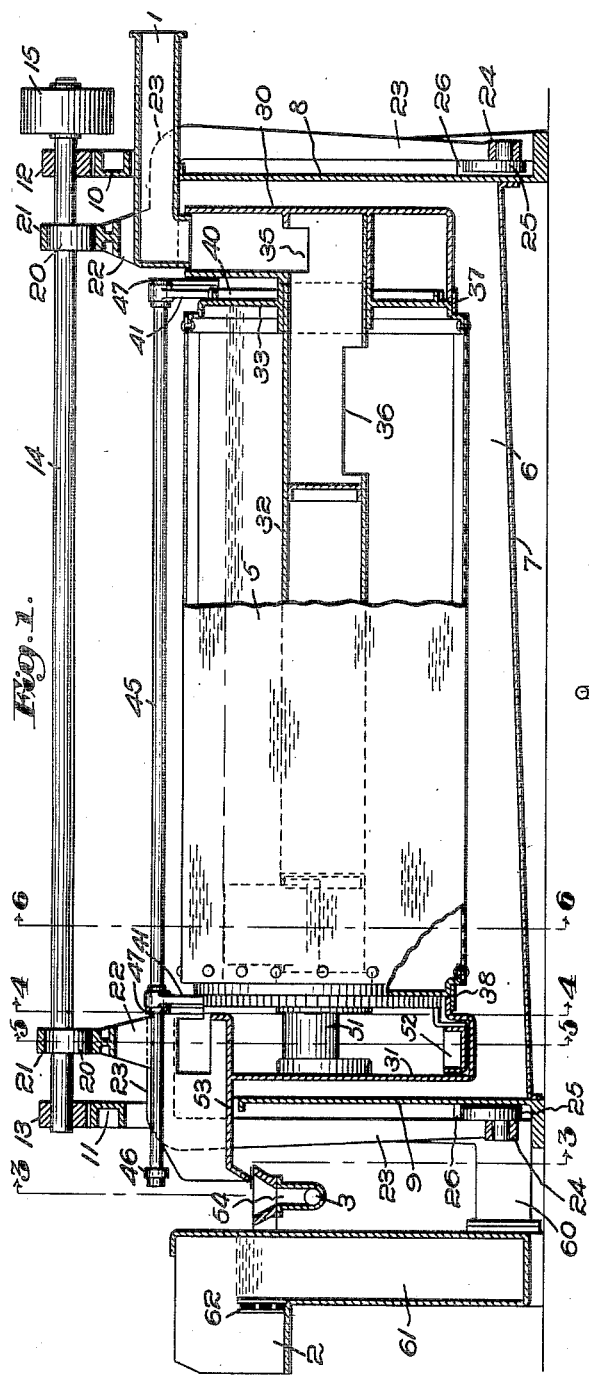
Inventor:
Anton J. Haug,
by Mary Booth Janney Varney
Attys.

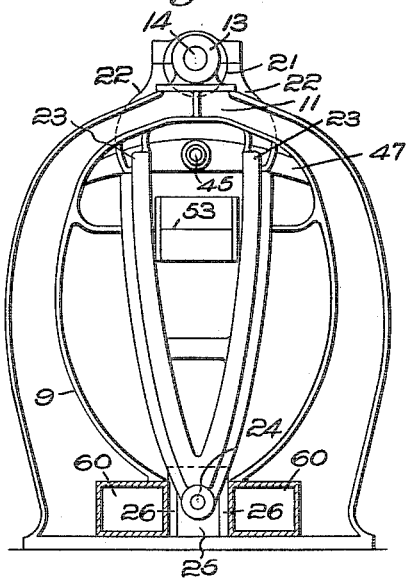
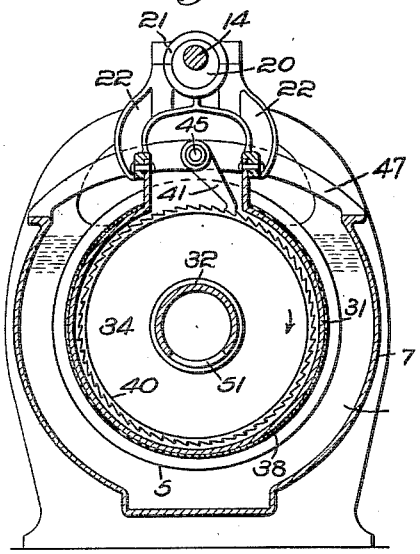
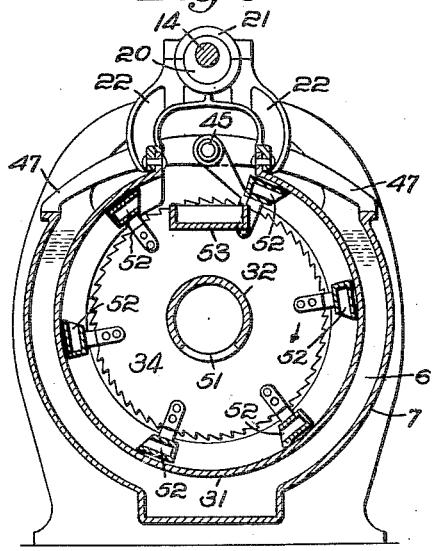
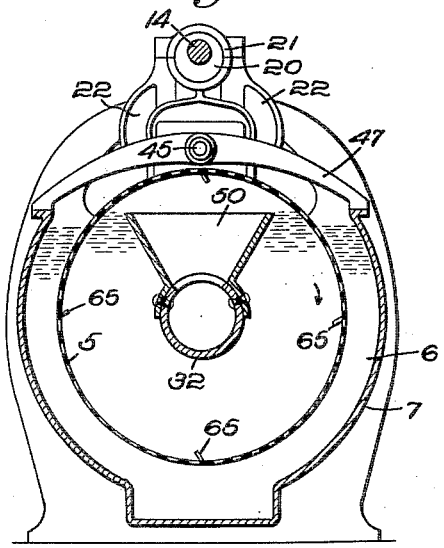

UNITED STATES PATENT OFFICE.

ANTON J. HAUG, OF NASHUA, NEW HAMPSHIRE, ASSIGNOR TO IMPROVED PAPER MACHINERY COMPANY, OF NASHUA, NEW HAMPSHIRE, A CORPORATION OF MAINE.

PULP-SCREENING.

1,319,705.

Specification of Letters Patent.

Patented Oct. 28, 1919.

Application filed January 28, 1918. Serial No. 214,088.

*To all whom it may concern:*

Be it known that I, ANTON J. HAUG, a citizen of the United States, and a resident of Nashua, county of Hillsborough, State of New Hampshire, have invented an Improvement in Pulp-Screening, of which the following description, in connection with the accompanying drawings, is a specification, like characters on the drawings representing like parts.

This invention relates to pulp screens, and more particularly to screens of the type where the screening action is assisted by a relative movement between the stock and the screening surface in a direction of transcolation adapted to carry the stock through the screen, as, for example, by a vibratory or oscillatory movement of the screening surface through the stock.

The invention will be best understood by reference to the following description when taken in connection with the accompanying illustration of one specific embodiment thereof, while its scope will be more particularly pointed out in the appended claims.

In the drawings:

Figure 1 is an elevation in partial section showing a screen embodying one form of my invention;

Fig. 2 is a diagram illustrating the movement which is imparted to the screen drum of the screen shown in Fig. 1;

Fig. 3 is a sectional elevation taken on the line 3—3 in Fig. 1 looking in the direction of the arrow;

Fig. 4 is a similar section on the line 4—4 in Fig. 1;

Fig. 5 is a similar section on the line 5—5 in Fig. 1; and

Fig. 6 is a similar section on the line 6—6 in Fig. 1.

Referring to the drawings, and to the embodiment of the invention which is there shown for illustrative purposes, I have shown a screening apparatus having an inlet 1 for the stock to be screened, a discharge 2 for the screened stock, and a waste pipe 3 for the tailings. The screening member may be of any desired form or construction, but is here shown in the form of a cylindrical drum 5, to the interior of which the stock is fed from the inlet 1, said drum being partly or wholly submerged within a surrounding tank or chamber 6, the latter formed by the main casing 7 and the end casing heads 8 and 9.

While the relative transcolating displacement between the stock and the screening member may be secured by other means, herein such displacement is effected by giving the screen drum itself a vibratory movement, while maintained submerged in the tank. In addition to the vibratory movement, there may be, and herein is, imparted to the screen drum also a movement of rotation.

To effect the vibratory movement of the screen drum, the latter is suspended upon supports which are given a compound oscillatory movement, so that a vibration is imparted to the drum, not only vertically, but horizontally as well. To this end, the head members 8 and 9 are extended up to form arches 10 and 11 for supporting the journal bearings 12 and 13 for the driving shaft 14, the latter being driven from any suitable source of power through the driving pulley 15.

At each end of the tank 6, and directly over the same, the shaft 14 is provided with an eccentric 20 on which are suspended, by means of the eccentric straps 21, the supporting yokes 22 for supporting the ends of the screen. These yokes, as indicated in Figs. 4 and 5, are fastened to the end of the screen supports and, as will fully appear, the screen partakes of the movements imparted to the yoke members 22. To assist in guiding the vibratory movements of the screen, the opposite arms of each supporting yoke are secured to, or formed integrally with, horizontal extensions 23 which project over beyond the end plates or casing 8, thence downwardly to a point near the bottom of the casing where they unite to form a pivotal connection at 24 with the vertically sliding block 25, the latter being guided for a limited vertical movement by the vertical guideways 26 formed at the bottom of the end plate or casing. The extensions 23 constitute a link connection which is pivotally joined to the vertical sliding block 25 and to the supporting yokes 22, so that, as the shaft 14 is rotated, the screen is not only vibrated vertically, but is given a rocking movement laterally about its pivotal connection with the block 25, thereby vibrating the screen within the limits indicated in Fig.

2, and causing every part of its submerged surface, the sides as well as the bottom, to be reciprocated and passed through the stock in a direction normal to the surface of the screen in some portion of its cycle of movement.

Rotary movement of the screen 1 is effected upon its end supports, the screen being suspended at the inlet end by means of the end support 30, and at the outlet end by means of the end support 31, these end supports partaking of the vibratory movement of the drum, but being herein shown as non-rotatable. The end supports 30 and 31 are connected by an axial, tubular member 32, on which the screen drum is adapted to turn, the drum being provided with preferably imperforate heads 33 and 34 journaled on the tubular member 32 and serving both as supports for the screen drum, and as end closures therefor.

The inlet pipe 1 is carried by and connected to the end support 30, the latter forming an inlet or receiving chamber from which the stock passes into the tubular member 32 through an opening 35, thence through the end closure 33 and into the interior of the screening drum through an opening 36 in the tubular member 32. The closures 33 and 34 for each end of the screen drum form a close-fitting joint with the end supports 30 and 32, which is protected by the packing rings 37 and 38 covering such portions of the joint as are submerged and exposed to the leakage of stock.

The vibratory movement of the screen drum is availed of also to give a slow rotary movement to the drum. For this purpose the end closures 33 and 34 have each formed upon them a ratchet ring 40, the teeth of which are adapted to be engaged by a pawl 41 pivoted at a point fixed on the stationary frame, so that, as the drum is given the described movement, the pawl serves to rotate the drum about the tubular member 32 step by step (in the direction of the arrow shown in Fig. 4), the pawl being caused to engage successive teeth in the ratchet ring 40 as the latter vibrates or oscillates with the screen drum. The two pawls 41 may be pivoted upon any fixed part of the apparatus, but herein for convenience they are pivotally supported upon the arch-shaped supporting brackets 47 which rest on the casing 7. The brackets 47 also serve to support a shower pipe 45, the latter connected to any suitable source of shower water at 46, the pipe extending lengthwise over the top of the screen drum and adapted to deliver shower water to the unsubmerged top thereof.

Discharge of the tailings from the screen drum takes place through the mouth of the discharge member 50 (Figs. 1 and 6), the latter opening into the tubular member 32, and preferably having its mouth placed at such an elevation as to maintain a high level of unscreened stock within the screen drum, as indicated in Fig. 6. The exit end of the tubular member 32 being shut off from the inlet end thereof by the partitions indicated in Fig. 1, the tailings pass from the discharge member 50 axially through the drum head 34 and through a discharge opening 51 into a discharge chamber formed within the end support 31, where the tailings are carried up by a series of scoops or lifters 52 which are secured to the drum head 34 to rotate therewith. From the scoops or lifters 52, the tailings are discharged upon an elevated discharge plate or chute 53, from which they pass out through the end of the casing and are delivered into the waste conduit 54.

As the screened stock passing from the interior to the exterior of the screening drum accumulates within the surrounding chamber, it passes from the chamber 6 through the divided or double discharge passages 60 (Figs. 1 and 3) into the chamber 61, over the preferably adjustable plate 62 to the discharge 2, and thence to any suitable reservoir or receptacle. The plate 62 maintains a head within the chamber 6, which is preferably somewhat lower than the head within the screen drum 5, but by making the plate vertically adjustable the head within the chamber may be adjusted as required.

To assist in the screening operation, the interior of the drum 5 may, if desired, be provided with projecting members, such as the paddles or blades 65 which are arranged longitudinally on the interior of the drum surface, and, as shown, are inclined slightly in the direction of rotation of the drum. These projecting blades serve to increase the vibratory, agitating and transcolating effect of moving the screen and also serve to bring within the radius of action of the shower water any accumulations of unscreened stock.

In the operation of the apparatus, the unscreened stock is fed to the screen drum through the inlet 1 under any suitable head, the arrangement of the plate 62 and the discharge orifice 50 being preferably such as to maintain the screen drum well submerged throughout its sides as well as its bottom. As the stock is flowed through the screening apparatus, the shaft 14 is rotated, effecting a compound, vibratory movement of the screen in substantially all directions, including a horizontal as well as a vertical direction, thus rendering the entire submerged surface, sides as well as bottom, effective for the screening action. With each vibratory movement of the screen, a slight rotative movement is also effected. This not only increases the efficiency of the screening action by rotating as well as vibrating the screening surface, but also washes successive portions of the screening surface through the shower water. These movements not only provide for a reciprocatory movement of the screening surface at right angles thereto, and for a movement of the stock transverse or across the surface, due to the rotation of the drum, but also for a relative movement of the stock lengthwise the surface due to the progressive feed or flow of the stock under its head through the screening apparatus. In addition to this, the stock, and particularly the solid accumulations thereof, is further agitated, turned over and washed by the action of the interior blade 65.

The invention, as to some of its features, might be embodied in a screening apparatus where the tank or casing, or the material within the same, is vibrated while the screen remains stationary. Where the screen is vibrated, however, the moving mechanism is required to set in operation a much smaller mass than where the tank is vibrated, and in the case of a deeply submerged screen, the buoyancy of the screen decreases the weight which must be lifted by the vibrating mechanism. For these and other reasons, the screen itself is preferably, though not necessarily, subjected to the vibratory movement.

While I have herein shown, for purposes of illustration, one specific embodiment of the invention, it will be understood that extensive deviations may be made therefrom, and wide variations may be made as to constructional details in form and relative arrangement of parts, without departing from the spirit thereof.

Claims.

1. In an apparatus for screening pulp, the combination with a tank, of a submerged screen drum, an inlet for feeding stock to the interior of the drum, said inlet being below the level of submergence, an outlet communicating with the tank for withdrawing the screened stock, whereby said stock advances progressively through said drum from the inlet toward the outlet, a tailings outlet for said drum, and means for vibrating the drum.

2. In an apparatus for screening pulp, the combination with a tank, of a submerged screen drum, an inlet for feeding stock to the interior of the drum, an outlet communicating with the tank for withdrawing the screened stock, whereby said stock advances progressively through said drum from the inlet toward the outlet, a tailings outlet for said drum, means for vibrating the drum, and means for simultaneously imparting a turning movement to the same.

3. In an apparatus for screening pulp, the combination with a tank, of a submerged screen drum, interiorly projecting blades secured to said drum, means for vibrating the drum, and means for rotating the same.

4. In an apparatus for screening pulp, the combination with a tank, of a submerged screen drum, means for causing a compound, vibratory movement to said drum, and interiorly projecting blades secured to said drum.

5. In an apparatus for screening pulp, the combination with a tank, of a casing, a screen drum within the same, end supports for said screen drum on which the latter is rotatable, said end supports carrying inlet and discharge passages, respectively, through which the stock is axially entered into and withdrawn from said drum, means for vibrating said end supports to vibrate said drum, and means for rotating said drum on said supports.

6. In an apparatus for screening pulp, the combination with a tank 8, of a screen 5, a tubular member 32, end supports 30 and 31, and vibratory supports 22.

7. In an apparatus for screening pulp, the combination with a tank, of a screen drum submerged therein, a discharge conduit for discharging stock from the drum located below the level of submergence, a chamber into which the stock is delivered from said conduit, a stock-delivery passage and means for elevating the stock in said chamber to a point above the level of submergence for delivery to said delivery passage.

8. In an apparatus for screening pulp, the combination with a rotatable screen drum, a tank or casing in which said drum is submerged, journal supports in which said rotatable drum is carried, an overhead supporting means for said drum, suspension devices for carrying said journals on said overhead supports, and means for imparting a vibratory movement to said carrying means to vibrate said drum.

9. In an apparatus for screening pulp, the combination with a rotatable screen drum, a tank or casing in which said drum is submerged, journal supports in which said rotatable drum is carried, an overhead supporting means for said drum, suspension devices for carrying said journals on said overhead supports, and means for vibrating said supports in a plurality of directions.

10. In an apparatus for screening pulp, the combination with a rotatable screen drum, of a tank, journal supports for said drum entering the tank from above, and means to vibrate said journal supports.

11. In an apparatus for screening pulp, the combination with a rotatable screen drum, of a tank, journal supports for said drum entering the tank from above, and means to impart a compound vibratory movement to said journal supports.

12. In an apparatus for screening pulp, the combination with a rotatable screen drum, of a tank or casing in which the drum is contained, journal supports for the drum, overhead supporting means with connecting means, journal supports entering said tank from above, and means for vibrating said drum.

13. In an apparatus for screening pulp, the combination with a rotatable screen drum, of a tank or casing in which the drum is contained, journal supports for the drum, overhead connections, means for swinging said connections, and a vertical guide piece attached to said connections to give a compound vibratory movement to the drum.

In testimony whereof, I have signed my name to this specification.

ANTON J. HAUG.